United States Patent
Lu et al.

(10) Patent No.: US 12,061,397 B2
(45) Date of Patent: Aug. 13, 2024

(54) DISPLAY PANEL AND DISPLAY DEVICE

(71) Applicant: Wuhan China Star Optoelectronics Technology Co., Ltd., Hubei (CN)

(72) Inventors: Yantao Lu, Hubei (CN); Changwen Ma, Hubei (CN); Guanghui Liu, Hubei (CN); Chao Wang, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/435,143

(22) PCT Filed: Aug. 9, 2021

(86) PCT No.: PCT/CN2021/111415
§ 371 (c)(1),
(2) Date: Aug. 31, 2021

(87) PCT Pub. No.: WO2023/000401
PCT Pub. Date: Jan. 26, 2023

(65) Prior Publication Data
US 2024/0012298 A1    Jan. 11, 2024

(30) Foreign Application Priority Data
Jul. 23, 2021  (CN) .......................... 202110836400.6

(51) Int. Cl.
G02F 1/1343    (2006.01)
G02F 1/1362    (2006.01)
(Continued)

(52) U.S. Cl.
CPC .. *G02F 1/134345* (2021.01); *G02F 1/136286* (2013.01); *G09G 3/3677* (2013.01); *G02F 1/1368* (2013.01); *G09G 2300/0408* (2013.01); *G09G 2300/0426* (2013.01); *G09G 2310/0248* (2013.01); *G09G 2320/02* (2013.01)

(58) Field of Classification Search
CPC ................. G09G 2310/0205; G09G 2330/021
See application file for complete search history.

(56) References Cited

U.S. PATENT DOCUMENTS

2010/0328558 A1* 12/2010 Asada ............... G02F 1/133707
348/792
2016/0252789 A1* 9/2016 Zheng .................. G02F 1/1368
349/43
(Continued)

FOREIGN PATENT DOCUMENTS

CN    102681273    9/2012
CN    103412447    11/2013
(Continued)

*Primary Examiner* — Van N Chow

(57) ABSTRACT

A display panel and a display device are provided. The display panel comprises sub-pixel electrodes and data line groups. The data line group includes at least two sub-data line groups. The sub-pixel electrode includes at least two sub-pixel electrode sections. By dispersing the data lines in the data line group into each sub-data line group and arranging the plurality of sub-data line groups on two sides of the sub-pixel electrode sections in each of the columns, the shading area of each of the data line groups can be reduced, thereby improving the problem of dark stripes on the display panel.

18 Claims, 5 Drawing Sheets

(51) Int. Cl.
    *G09G 3/36*         (2006.01)
    *G02F 1/1368*     (2006.01)

(56)             References Cited

U.S. PATENT DOCUMENTS

| | | | |
|---|---|---|---|
| 2018/0308909 A1* | 10/2018 | Shih | G06F 3/044 |
| 2022/0100321 A1* | 3/2022 | Choi | H04M 1/0266 |
| 2022/0189405 A1* | 6/2022 | Bai | G09G 3/3266 |
| 2022/0234046 A1* | 7/2022 | Wilson | B03C 1/02 |
| 2023/0314888 A1* | 10/2023 | Wang | G06F 3/0412 |
| | | | 349/147 |

FOREIGN PATENT DOCUMENTS

| | | |
|---|---|---|
| CN | 103676387 | 3/2014 |
| CN | 104834142 | 8/2015 |
| CN | 109634012 | 4/2019 |
| CN | 109658895 | 4/2019 |
| CN | 113096579 | 7/2021 |

* cited by examiner

DISPLAY PANEL AND DISPLAY DEVICE

RELATED APPLICATIONS

This application is a National Phase of PCT Patent Application No. PCT/CN2021/111415 having International filing date of Aug. 9, 2021, which claims the benefit of priority of Chinese Patent Application No. 202110836400.6 filed on Jul. 23, 2021. The contents of the above applications are all incorporated by reference as if fully set forth herein in their entirety.

FIELD AND BACKGROUND OF THE INVENTION

The present disclosure relates to the technical field of display, which particularly relates to a display panel and a display device.

As liquid crystal display (LCD) panels operate at a higher resolution and higher refresh rate, problems such as insufficient pixel charging often occur. For example, regional sequential color liquid crystal display (frequency shift converter, FSC) panels and liquid crystal display panels with large size, high resolution, and high refresh rate. To achieve the charging efficiency of the liquid crystal display panel under high frequency, the number of data lines is increased several times, and multiple rows of sub-pixel electrodes are charged together at the same time, so that the voltage of each of the sub-pixel electrodes may reach a preset value by increasing the charging time.

Technical Problems

Since the increased number of data lines occupying a total width between adjacent sub-pixel electrodes is several times larger than the width occupied by a single data line between adjacent sub-pixel electrodes, when the total width of the increased data lines is larger, the area of each sub-pixel unit that is blocked by the increased number of data lines will be larger. The area corresponding to the data lines increased by several times does not emit light, which causes the problem of dark stripes on the display panel.

As mentioned above, the existing liquid crystal display panel has the problem of dark stripes. Therefore, it is necessary to provide a display panel and a display device to improve this defect.

SUMMARY OF THE INVENTION

Technical Solutions

Embodiment of the present disclosure provide a display panel and a display device, which are used to solve the problem of dark stripes in the existing liquid crystal display panel.

An embodiment of the present disclosure provides a display panel, wherein the display panel comprises:
  a plurality of sub-pixel electrodes arrayed in rows and columns; and
  a plurality of data line groups, wherein each data line group controls a charging state of the sub-pixel electrodes in a corresponding column;
  wherein each of the sub-pixel electrodes includes at least two sub-pixel electrode sections arranged side by side at intervals and coupled to each other, each of the data line groups includes at least two sub-data line groups, each of the sub-data line groups includes at least one data line, the sub-data line groups are respectively arranged on two sides of the sub-pixel electrode sections in each of the columns, and the sub-data line groups of each of the data line groups are respectively connected to the sub-pixel electrodes in different rows and in a same column.

According to an embodiment of the present disclosure, each of the sub-pixel electrodes further includes a first connecting portion and a second connecting portion, each of the sub-pixel electrode sections includes a plurality of strip electrodes arranged side by side at intervals, the first connecting portion is configured to connect each of the strip electrodes located in a same sub-pixel electrode section, and the second connecting portion is configured to connect each of the sub-pixel electrode sections located in the same sub-pixel electrode.

According to an embodiment of the present disclosure, the first connecting portion is disposed on at least one end of one of the strip electrodes, the second connecting portion is disposed between adjacent ones of sub-pixel electrode sections in the same sub-pixel electrode, opposite ends of the second connecting portion are respectively connected to an adjacent first connecting portion or connected to the strip electrodes in two adjacent sub-pixel electrode sections.

According to an embodiment of the present disclosure, at least two the sub-pixel electrode sections located in a same sub-pixel electrode have a same width in an extending direction perpendicular to the data line.

According to an embodiment of the present disclosure, a width of each of the sub-data line groups in an extending direction perpendicular to the data line is less than or equal to 20 μm.

According to an embodiment of the present disclosure, a width of each of the sub-data electrodes section in an extending direction perpendicular to the data line is greater than or equal to 20 μm, and less than or equal to 50 μm.

According to an embodiment of the present disclosure, a width of each of the sub-pixel electrodes in an extending direction perpendicular to the data line is greater than or equal to 100 μm, and less than or equal to 200 μm.

According to an embodiment of the present disclosure, each of the sub-data line groups in a same data line group is connected to the sub-pixel electrodes in the corresponding column.

According to an embodiment of the present disclosure, the sub-data line group includes at least two data lines, the data lines in a same sub-data line group are respectively connected to the sub-pixel electrodes in adjacent rows and in the same column.

According to an embodiment of the present disclosure, the data lines in the same data line group are alternately connected to the sub-pixel electrodes in the corresponding column in turn.

According to an embodiment of the present disclosure, the display panel further comprises a plurality of scan lines and cascaded gate drive circuits, each of the scan line is connected to the sub-pixel electrodes in a corresponding row through a switch thin film transistor, and the gate drive circuit of each stage is connected to corresponding one or more scan lines.

An embodiment of the present disclosure further provides a display device comprising a display panel, wherein the display panel comprises:
  a plurality of sub-pixel electrodes arrayed in rows and columns; and_ a plurality of data line groups, wherein each data line group controls a charging state of the sub-pixel electrodes in the corresponding column;

wherein each of the sub-pixel electrodes includes at least two sub-pixel electrode sections arranged side by side at intervals and coupled to each other, each of the data line groups includes at least two sub-data line groups, each of the sub-data line groups includes at least one data line, the sub-data line groups are respectively arranged on two sides of the sub-pixel electrode sections in each column, and the sub-data line groups of the data line group are respectively connected to the sub-pixel electrodes in different rows and in a same column.

According to an embodiment of the present disclosure, each of the sub-pixel electrodes further includes a first connecting portion and a second connecting portion, each of the sub-pixel electrode sections includes a plurality of strip electrodes arranged side by side at intervals, the first connecting portion is configured to connect each of the strip electrode located in a same sub-pixel electrode section, and the second connecting portion is configured to connect each of the sub-pixel electrodes section located in the same sub-pixel electrode.

According to an embodiment of the present disclosure, the first connecting portion is disposed on at least one end of one of the strip electrodes, the second connecting portion is disposed between adjacent ones of sub-pixel electrode sections in the same sub-pixel electrode, opposite ends of the second connecting portion are respectively connected to an adjacent first connecting portion or connected to the strip electrodes in two adjacent sub-pixel electrode sections.

According to an embodiment of the present disclosure, at least two the sub-pixel electrode sections located in a same sub-pixel electrode have a same width in an extending direction perpendicular to the data line.

According to an embodiment of the present disclosure, a width of each of the sub-data line groups in an extending direction perpendicular to the data line is less than or equal to 20 μm.

According to an embodiment of the present disclosure, a width of each of the sub-data electrode sections in an extending direction perpendicular to the data line is greater than or equal to 20 μm, and less than or equal to 50 μm.

According to an embodiment of the present disclosure, a width of each of the sub-pixel electrodes in an extending direction perpendicular to the data line is greater than or equal to 100 μm, and less than or equal to 200 μm.

According to an embodiment of the present disclosure, each of the sub-data line groups in a same data line group is connected to the sub-pixel electrodes in the corresponding column.

According to an embodiment of the present disclosure, the sub-data line group includes at least two data lines, the data lines in a same sub-data line group are respectively connected to the sub-pixel electrodes in adjacent rows and in the same column.

Beneficial Effects

The beneficial effects of the embodiments of the present disclosure are as follows: the embodiments of the present disclosure provide a display panel and a display device. The display panel includes a plurality of sub-pixel electrodes and a plurality of data line groups arrayed in rows and columns. The data line group includes at least two sub-data line groups. The sub-pixel electrode includes at least two sub-pixel electrode sections arranged side by side at intervals and coupled to each other. The sub-data line groups are respectively arranged on two sides of the sub-pixel electrode sections in each of the columns. The sub-data line groups of each of the data line groups are respectively connected to the sub-pixel electrodes in different rows and in a same column. By dispersing the data lines in the data line group into each sub-data line group and arranging the plurality of the sub-data line groups on two sides of the sub-pixel electrode sections in each of the columns of the sub-pixel electrodes to reduce the width of each of data line groups. Therefore, the shading area of each of the data line groups is reduced, and the problem of dark stripes in the display panel may be improved while ensuring the high refresh frequency of the display panel.

BRIEF DESCRIPTION OF THE SEVERAL VIEWS OF THE DRAWINGS

To describe the technical solutions more clearly in the embodiments of the present disclosure, the following will briefly introduce the drawings that need to be used in the description of the embodiments. Obviously, the drawings in the following description are only some embodiments of the present disclosure, and for those skilled in the art, other drawings can be obtained based on these drawings without creative work.

DESCRIPTION OF SPECIFIC EMBODIMENTS OF THE INVENTION

Figure 1:
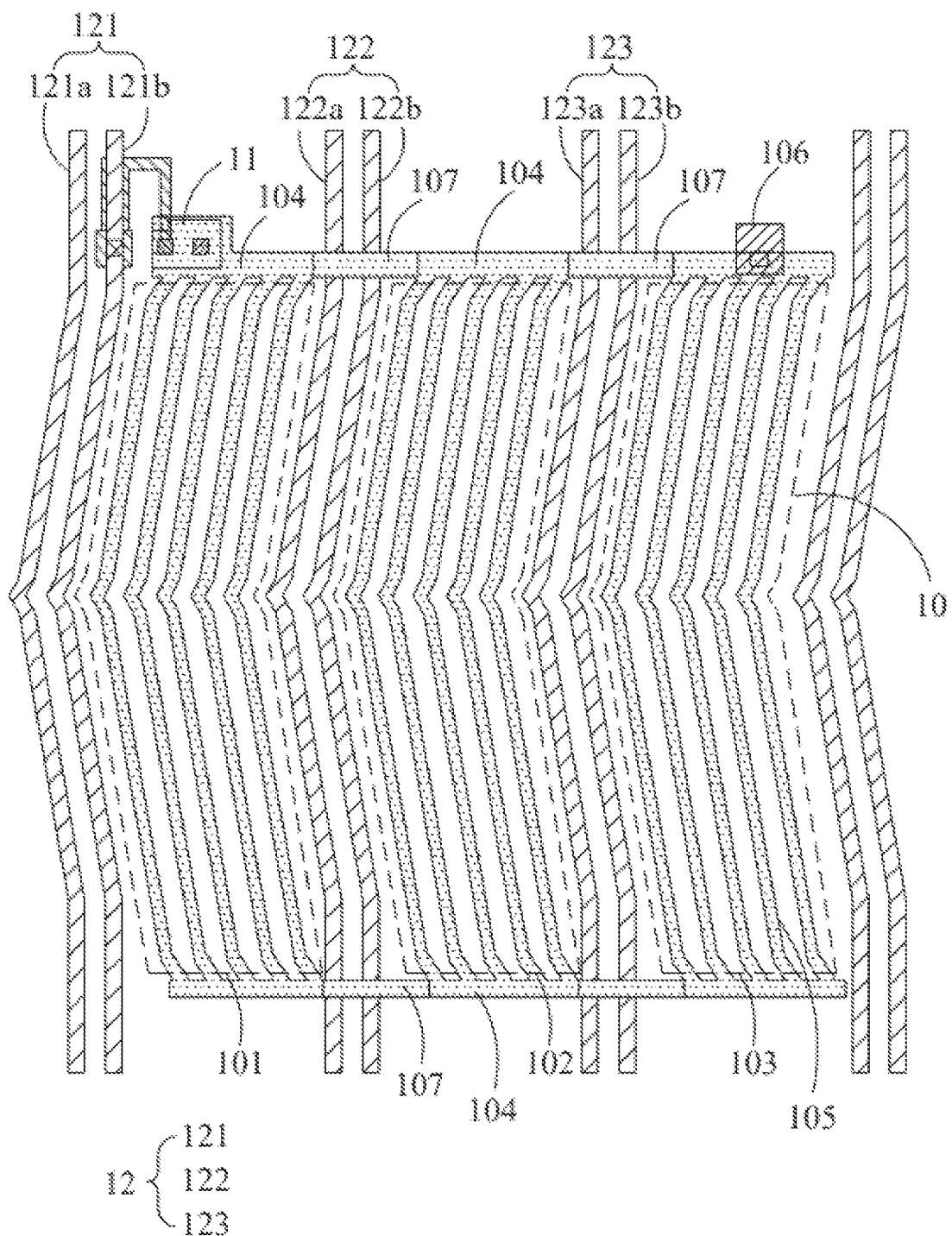
FIG. 1 is a schematic diagram of a structure of a sub-pixel electrode according to an embodiment of the present disclosure.

The description of the following embodiments refers to the attached drawings to illustrate specific embodiments that the present disclosure can be implemented. The direction terms mentioned in the present invention, such as up, down, front, back, left, right, inner, outer, side, etc., are only directions for referring to the attached drawings. Therefore, the directional terms used are used to illustrate and understand the present disclosure, rather than to limit the present disclosure. In the figure, units with similar structures are indicated by the same reference numerals.

The present disclosure is further described below in conjunction with the drawings and specific embodiments:

An embodiment of the present disclosure provides a display panel. The display panel 100 includes a plurality of sub-pixel electrodes 10 and a plurality of data line groups 12, wherein the plurality of sub-pixel electrodes 10 are arrayed in rows and columns. Each of the data line groups 12 is connected to the sub-pixel electrodes 10 in a corresponding column and controls a charging state of the sub-pixel electrodes 10 in a corresponding column.

Each of the sub-pixel electrodes 10 includes at least two sub-pixel electrode sections arranged side by side at intervals and coupled to each other. Each of the data line groups includes at least two sub-data line groups. The sub-data line groups are respectively arranged on two sides of the sub-pixel electrode sections in each of the columns. The sub-data line groups 12 of each of the data line groups 12 are respectively connected to the sub-pixel electrodes 10 in different rows and in a same column.

Figure 2:
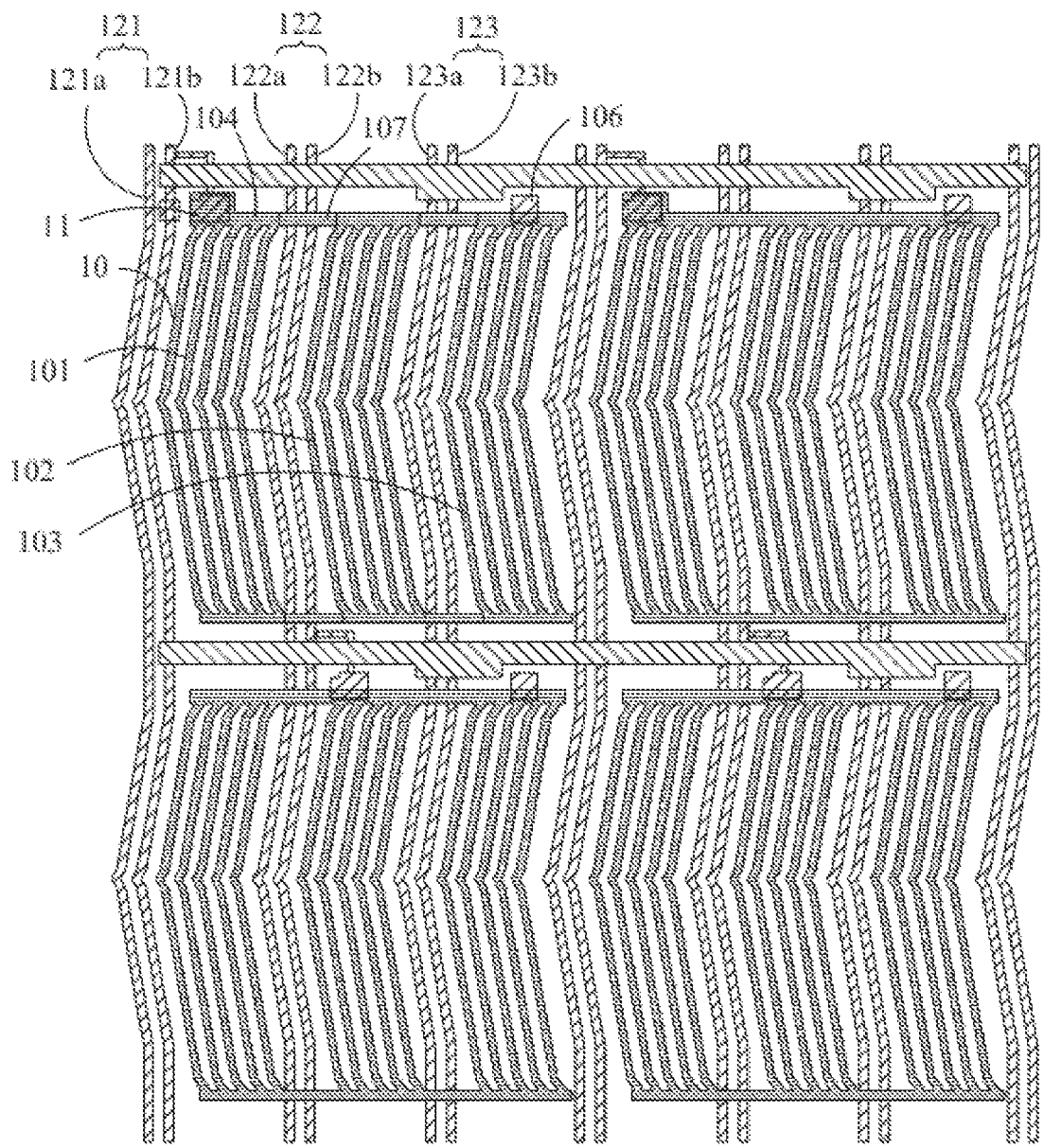
FIG. 2 is a schematic diagram of a structure of multiple adjacent sub-pixel electrodes according to an embodiment of the present disclosure.

Refer to FIG. 1 and FIG. 2. FIG. 1 is a schematic diagram of a structure of a sub-pixel electrode according to an embodiment of the present disclosure. FIG. 2 is a schematic diagram of a structure of multiple adjacent sub-pixel electrodes according to an embodiment of the present disclosure. In the embodiment of the present disclosure, each of the sub-pixel electrodes 10 includes a first sub-pixel electrode section 101, a second sub-pixel electrode section 102, and a third sub-pixel electrode section 103. The first sub-pixel electrode section 101 and the second first sub-pixel electrode section 102 are connected to each other. The second sub-pixel electrode section 102 and the third first sub-pixel electrode section 103 are connected to each other. In this way, it is only necessary to make any one of the three sub-pixel electrode sections connect to the corresponding data line, so that each sub-pixel electrode section may be charged.

In actual use, the number of sub-pixel electrode sections included in each sub-pixel electrode 10 is not limited to three in the above-mentioned embodiment, and may also be two, four, or five.

In the embodiment of the present disclosure, each of the data line groups 12 includes three sub-data line groups, namely a first sub-data line group 121, a second sub-data line group 122, and a third sub-data line group 123. Each of the sub-data line groups includes two data lines arranged side by side at intervals.

Refer to FIG. 1. The first sub-data line group 121 located on the left side of the first sub-pixel electrode section 101 includes a data line 121a and a data line 121b. The second sub-data line group 122 located on the right side of the first sub-pixel electrode section 101 includes a data line 122a and a data line 122b. The third sub-data line group 123 located on the right side of the second sub-pixel electrode section 102 includes a data line 123a and a data line 123b. The data line 121b located in the first sub-data line group 121 is connected to the source of a switching thin film transistor 11 corresponding to the sub-pixel electrode 10. The sub-pixel electrodes 10 are respectively connected to the drain of the switching thin film transistor 11 and a common electrode 106 on the side of an array substrate. The data line 121a, the data line 121b, the data line 122a, the data line 122b, the data line 123a, and the data line 123b are respectively connected to the sources of thin film transistors corresponding to other sub-pixel electrodes in a same column.

In actual use, the number of data lines included in each of sub-data line groups is not limited to two in the above embodiment, and may also be one, three, or four.

Furthermore, each of the sub-pixel electrodes 10 further includes a first connecting portion 104 and a second connecting portion 107. Each of the sub-pixel electrode sections includes a plurality of strip electrodes 105 arranged side by side at intervals. The first connecting portion 104 is configured to connect each of the strip electrodes located in a same sub-pixel electrode section, and the second connecting portion 107 is configured to connect each of the sub-pixel electrode sections located in the same sub-pixel electrode 10.

In the embodiment of the present disclosure, the first sub-pixel electrode section 101, the second sub-pixel electrode section 102, and the third sub-pixel electrode section 103 include the plurality of strip electrodes 105 arranged side by side at intervals. An extending direction of the strip electrodes 105 is parallel to an extending direction of each of the data lines in the data line group 12.

The first connecting portion 104 connects the plurality of the strip electrodes 105 in each of the sub-pixel electrode sections, so that the strip electrodes 105 are connected to each other. The second connecting portion 107 connects the first sub-pixel electrode section 101 and the second sub-pixel electrode section 102 and connects the second sub-pixel electrode section 102 and the third sub-pixel electrode section 103, so that the first sub-pixel electrode section 101, the second sub-pixel electrode section 102, and the third sub-pixel electrode section 103 are electrically connected.

Furthermore, the first connecting portion 104 is disposed on at least one end of one of the strip electrodes 105. The second connecting portion 107 is disposed between adjacent ones of sub-pixel electrode sections in the same sub-pixel electrode. Opposite ends of the second connecting portion 107 are respectively connected to an adjacent first connecting portion 104 or connected to the strip electrodes 105 in two adjacent sub-pixel electrode sections.

In the embodiment of the present disclosure, each of the sub-pixel electrodes 10 includes a plurality of first connecting portions 104 and plurality of second connecting portions 107, wherein the first connecting portion 104 is perpendicular to an extending direction of each of data lines in the data line group 12.

Taking the first sub-pixel electrode section 101 as an example, the two first connecting portions 104 are respectively disposed at opposite ends of each of the strip electrodes 105 in the first sub-pixel electrode section 101 and connected to each of the strip electrodes 105 in the first sub-pixel electrode section 101. In the other sub-pixel electrode section, the distribution of the first connection portions 104 are the same as the distribution of the first sub-pixel electrode section 101 and will not be repeated here. In actual use, the first connecting portions 104 may also be provided only at one end of the strip electrode 105 or the middle area of the strip electrode 105.

Taking the first sub-pixel electrode section 101 and the second sub-pixel electrode section 102 as an example, the second connecting portion 107 is disposed between the adjacent first sub-pixel electrode section 101 and the second sub-pixel electrode section 102. Opposite ends of the second connecting portion 107 are respectively connected to the two first connecting portions 104 to connect the first sub-pixel electrode section 101 and the second sub-pixel electrode section 102 to conduction. The first connecting portion 104 and the second connecting portion 107 may be prepared through the same process. In actual use, opposite ends of the second connecting portion 107 may also be connected to the strip electrodes 105 in the first sub-pixel electrode section 101 and the strip electrodes 105 in the second sub-pixel electrode section 102, respectively. Similarly, the first sub-pixel electrode section 101 and the second sub-pixel electrode section 102 may be connected to conduction.

Further, at least two sub-pixel electrode sections located in the same sub-pixel electrode 10 have a same width in an extending direction perpendicular to the data line.

In the embodiment of the present disclosure, the widths of the first sub-pixel electrode section 101, the second sub-pixel electrode section 102, and the third sub-pixel electrode section 103 in each of the sub-pixel electrodes 10 are equal, wherein the widths are perpendicular to the extending direction of the data line. In this way, not only can the difficulty of process monitoring in the manufacturing process of the display panel be reduced, but also the size of each sub-pixel electrode can be equalized. That is, the area of the light-transmitting area of each sub-pixel in the display panel 100 is equal, so that the brightness of each area of the display panel 100 is consistent. In actual use, each of the sub-pixel electrodes may include two or more sub-pixel electrode sections. When there are more than two sub-pixel electrode sections in the sub-pixel electrode, it is necessary to make at least two or more sub-pixel electrode sections of the sub-pixel electrodes have the same width, which can reduce the difficulty of process monitoring.

Further, a width of each of the data line groups 12 in an extending direction perpendicular to the data line is less than or equal to 20 μm.

In the embodiment of the present disclosure, as shown in FIG. 1, each of the sub-data line groups includes two data lines arranged side by side at an interval, and the width of the sub-data line group perpendicular to the extending direction of the data line is 10 μm. In this way, the data lines in the data line group 12 may be dispersed into each sub-data line group to reduce the area of the light-shielding area of each of the data line groups 12, thereby improving the problem of dark stripes on the display panel. In actual use, the width of the data line group in the extending direction perpendicular to the data line is not limited to said 10 μm, but can also be 6 μm, 12 μm, 16 μm or 20 μm, etc., and only needs to be less than or equal to 20 μm.

Further, a width of each of the sub-data electrodes section in an extending direction perpendicular to the data line is greater than or equal to 20 μm, and less than or equal to 50 μm.

In the embodiment of the present disclosure, the widths of the first sub-pixel electrode section 101, the second sub-pixel electrode section 102, and the third sub-pixel electrode section 103 are equal, and the widths are perpendicular to the extension direction of the data line. The width of the first sub-pixel electrode section 101 in the extending direction perpendicular to the data line is 34 μm. In this way, the width of each sub-pixel electrode section may be made larger than the width of each data line group, to avoid the occurrence of dark stripes on the display panel caused by the too small width of each sub-pixel electrode section. It can also avoid the situation that the resolution of the display panel is reduced due to the excessively large width of each sub-pixel electrode section. In actual use, the width of each sub-pixel electrode section perpendicular to the extension direction of the data line is not limited to said 34 μm, and can also be 20 μm, 25 μm, 30 μm, 35 μm, 40 μm, 45 μm, or 50 microns, etc., only need to be greater than or equal to 20 μm and less than or equal to 50 μm.

Further, a width of each of the sub-pixel electrodes in an extending direction perpendicular to the data line is greater than or equal to 100 μm, and less than or equal to 200 μm.

In the embodiment of the present disclosure, the width of each of the sub-pixel electrodes 10 in the extending direction perpendicular to the data line is 122 μm. In this way, the width of each of the sub-pixel electrode sections in the sub-pixel electrode 10 may meet the requirements of the display effect, and the occurrence of dark stripes on the display panel due to the excessively large width of each data line group can be avoided. In actual use, the width of each of the sub-pixel electrodes 10 in the extending direction perpendicular to the data line is not limited to said 122 μm, but can also be 100 μm, 110 μm, 140 μm, 160 μm, or 200 μm. etc., it only needs to be greater than or equal to 100 μm and less than or equal to 200 μm.

Further, each of the sub-data line groups in the same data line group 12 is connected to the sub-pixel electrodes in a corresponding column. Each of the data lines in the same sub-data line group is connected to the sub-pixel electrodes 10 in the adjacent rows and in the same column. Each of the data lines in the same data line group is alternately connected to each of the sub-pixel electrodes in a corresponding column in turn.

Figure 3:
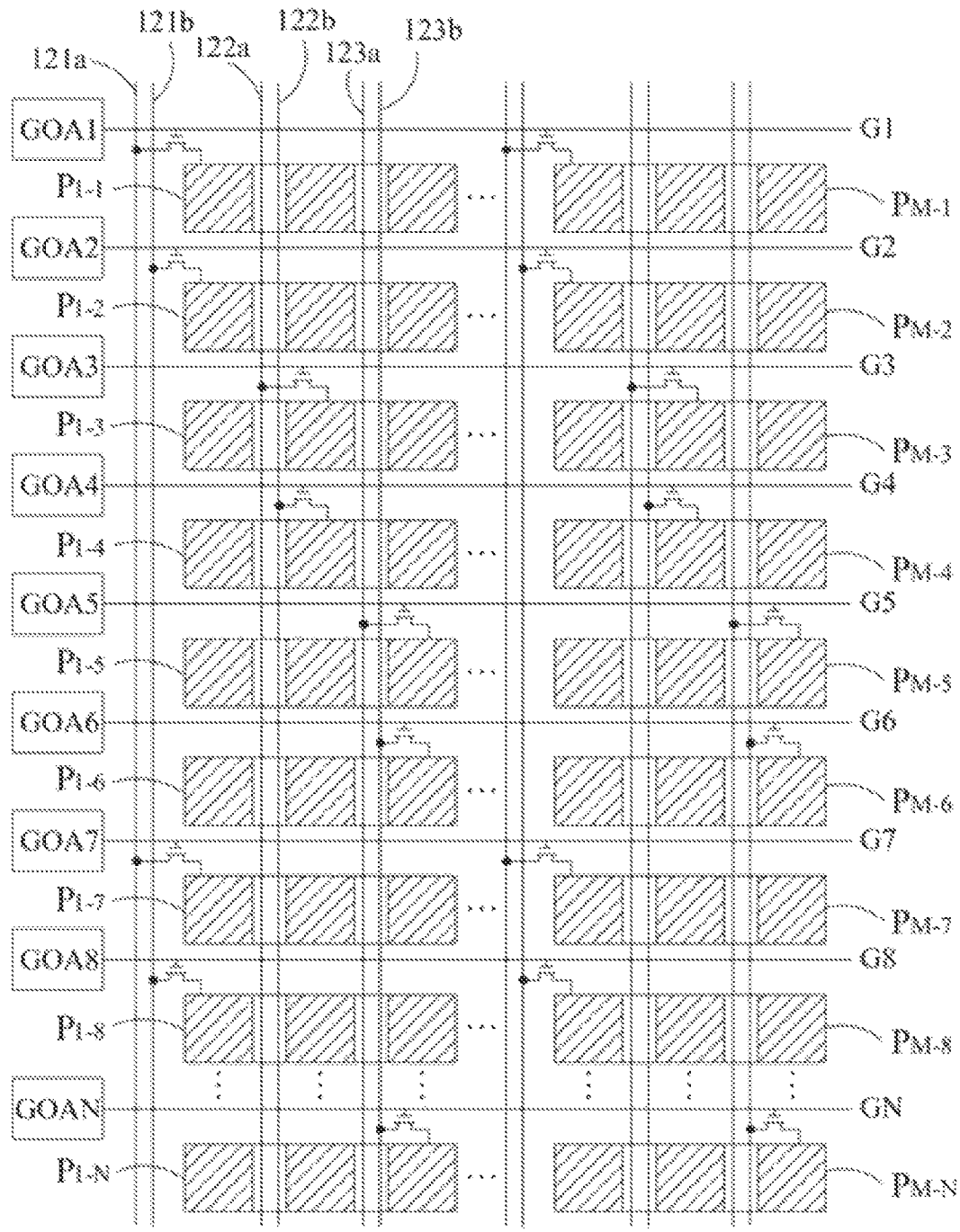
FIG. 3 is a schematic diagram of a structure of a first display panel according to an embodiment of the present disclosure.

FIG. 3 is a schematic diagram of a structure of a first display panel according to an embodiment of the present disclosure. In the embodiment of the present disclosure, the display panel has sub-pixel electrodes arranged in M columns and N rows (P1-1, P1-2, P1-3 . . . PM-N, M and N are positive integers). Taking the sub-pixel electrodes in the first column as an example, the sub-pixel electrodes in the first column are P1-1, P1-2, P1-3 . . . P1-N from top to bottom. The data line group 12 corresponding to sub-pixel electrodes located in the first column includes a first sub-data line group 121, a second sub-data line group 122, and a third sub-data line group 123. The first sub-data line group 121, the second sub-data line group 122, and the third sub-data line group 123 are alternately connected to each of the sub-pixel electrodes in the first column through thin film transistors.

Specifically, as shown in FIG. 3, the first column of sub-pixel electrodes is taken as an example for description. The data line 121a in the first sub-data line group 121 is connected to P1-1, P1-7, P1-13 . . . P1-(6a+1) (a≥0 and an integer) in the first column of sub-pixel electrodes. The data line 121b in the first sub-data line group 121 is connected to P1-2, P1-8, P1-14 . . . P1-(6a+2) (a≥0 and an integer) in the first column of sub-pixel electrodes. The data line 122a in the second sub-data line group 122 is connected to P1-3, P1-9, P1-15 . . . P1-(6a+3) (a≥0 and an integer) in the first column of sub-pixel electrodes. The data line 122b in the second sub-data line group 122 is connected to P1-4, P1-10, P1-16 . . . P1-(6a+4) (a≥0 and an integer) in the first column of sub-pixel electrodes. The data line 123a in the third sub-data line group 123 is connected to P1-5, P1-11, P1-17 . . . P1-(6a+5) (a≥0 and an integer) in the first column of sub-pixel electrodes. The data line 123b in the third sub-data line group 123 is connected to P1-6, P1-12, P1-18 . . . P1-(6a+6) (a≥0 and an integer) in the first column of sub-pixel electrodes. By analogy, the six data lines in the data line group corresponding to the first column of sub-pixel electrodes are alternately connected to each sub-pixel electrode in the first column of sub-pixel electrodes. The connection of the sub-pixel electrodes in the M-th column (PM-1, PM-2, PM-3 . . . PM-N) and the data lines in the corresponding data line group is the same as that of the sub-pixel electrodes in the first column of sub-pixel electrodes. The connection will not be repeated here.

Further, the display panel 100 further comprises a plurality of scan lines and cascaded gate drive circuits. Each of the scan lines is connected to the sub-pixel electrodes in a corresponding row through a switch thin film transistor, and the gate drive circuit of each stage is connected to corresponding one or more scan lines.

In the embodiment of the present disclosure, as shown in FIG. 3, the display panel 100 includes a plurality of scan lines G1, G2, G3, G4, G5, G6 . . . GN and a plurality of cascaded gate drive circuits GOA1, GOA2, GOA3, GOA4, GOA5, GOA6 . . . GOAN. The scan lines G1 to GN are respectively connected to the gates of the switching thin film transistors corresponding to the first row to the Nth row of sub-pixel electrodes, and the gate drive circuits GOA1 to GOAN correspond to the scan lines G1 to GN respectively and are connected to each other.

The process of charging each of the sub-pixel electrodes is as follows: under the individual control of the gate drive circuits GOA1 to GOA6, the 6 scan lines G1 to G6 turn on their corresponding row of switching thin film transistors, respectively. The data line 121a to the data line 123b simultaneously transmit data voltage signals to the sub-pixel electrodes in the first row to the sixth row, and simultaneously charge the sub-pixel electrodes in the first row to the sixth row. When the sub-pixel electrodes in the first to sixth rows are fully charged, under the individual control of the gate drive circuits GOA7 to GOA12, the six scan lines G7 to G12 are respectively turned on from the corresponding row of switching thin film transistors. The data lines 121a to 123b simultaneously transmit data voltage signals to the sub-pixel electrodes in the 7th to 12th rows, and simultaneously charge the sub-pixel electrodes in the 7th to 12th rows. By analogy, six adjacent rows of sub-pixel electrodes may be charged each time until sub-pixel electrodes in the last row are fully charged. Through 6 data lines in the 3 data line groups corresponding to sub-pixel electrodes in each column, the sub-pixel electrodes in 6 rows may be charged at the same time. In this way, it is possible to reduce the time required to charge the voltages of all sub-pixel electrodes to a preset value within one frame by simultaneously charging the sub-pixel electrodes in multiple rows. Therefore, under the premise of ensuring a higher refresh frequency, the voltage of each sub-pixel electrode may reach a preset voltage value within a preset time.

It should be noted that FIG. 3 only illustrates the connection relationship between part of the gate drive circuit and the scan line in the display panel 100, and the parts omitted by the ellipsis in FIG. 3 can be repeated according to the structure in the above embodiment. The number of sub-pixel electrodes 10, gate drive circuits, and scan lines of the second display panel shown in FIG. 3 does not represent the number of sub-pixel electrodes 10, gate drive circuits, and scan lines included in the display panel 100 in actual use.

Figure 4:
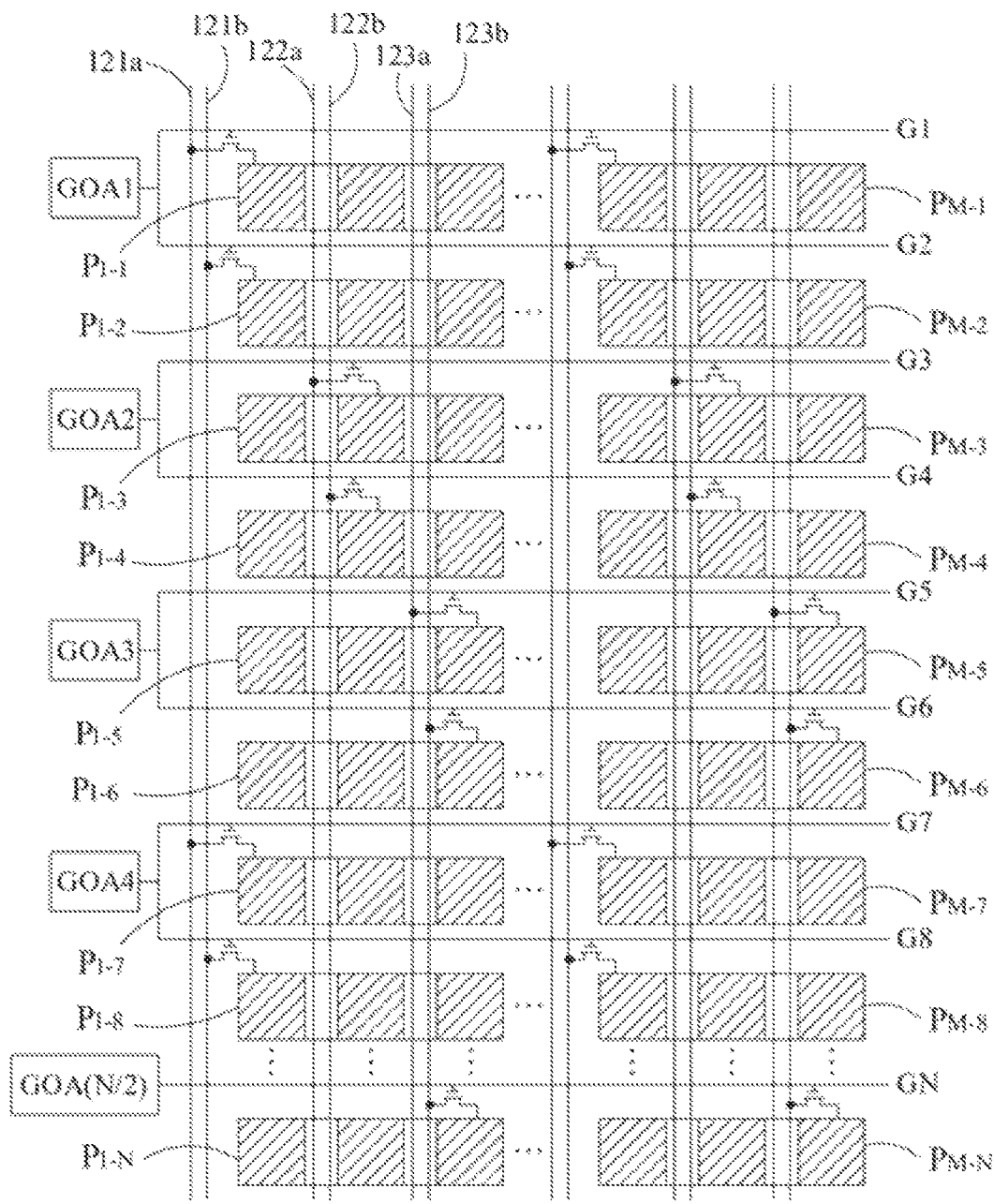
FIG. 4 is a schematic diagram of a structure of a second display panel according to an embodiment of the present disclosure.

FIG. 4 is a schematic diagram of a structure of a second display panel according to an embodiment of the present disclosure. The structure of the second display panel shown in FIG. 4 is roughly the same as the structure of the first display panel shown in FIG. 3. The difference is: in the second display panel shown in FIG. 4, the gate drive circuit GOA1 is connected to the scan line G1 and the scan line G2, the gate drive circuit GOA2 is connected to the scan line G3 and the scan line G4, and the gate drive circuit GOA3 is connected scan lines G5 and G6. By analogy, in the part omitted by the ellipsis, each of the gate drive circuits is connected to two scan lines until the gate drive circuit GOA (N/2) is connected to the scan line G(N−1) and the scan line GN. In this way, one gate drive circuit may control two rows of sub-pixel electrodes 10 to be charged at the same time, so that the number of gate drive circuits in the display panel 100 can be effectively reduced.

Further, the display panel 100 further includes a plurality of color resists corresponding to the plurality of sub-pixel electrodes 10. Each of the color resists includes at least two color-resist sections arranged side by side at intervals. A black matrix is arranged on both sides of each of the color-resist sections.

Figure 5:
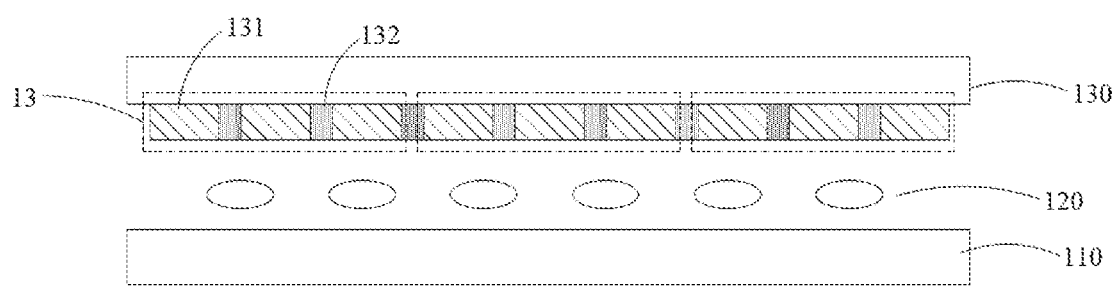
FIG. 5 is a schematic diagram of a stacking structure of a display panel according to an embodiment of the present disclosure.

FIG. 5 is a schematic diagram of a stacking structure of a display panel according to an embodiment of the present disclosure. The display panel is an IPS type liquid crystal display panel, which includes an array substrate 110, a color filter substrate 130, and a liquid crystal layer 120 arranged between the array substrate 110 and the color filter substrate 130, which are arranged oppositely. The array substrate 110 includes a plurality of sub-pixel electrodes 10, a plurality of switching thin film transistors T, a plurality of data line groups 12, a plurality of scan lines, and a plurality of cascaded gate drive circuits. The color filter substrate 130 includes a plurality of color resists 13 corresponding to the plurality of sub-pixel electrodes 10. The color resists 13 includes red color resist, green color resists, and blue color resists. Each of the color resists 13 includes at least two color-resist sections 131 arranged side by side at intervals. The color-resist sections 131 are aligned with the sub-pixel electrode sections on the array substrate 110. A black matrix 132 is arranged on two sides of each of the color-resist sections 131, and the black matrix 132 is aligned with each of sub-data line groups on the array substrate 110. In this way, the black matrix 132 may be used to shield the sub-data line groups in each of data line groups 12 to avoid light leakage in the portion of the display panel 100 corresponding to the data line group 12.

In actual use, the type of the display panel is not limited to the above-mentioned IPS type liquid crystal display panel, and may also be a VA type, a TN type, or a frequency shift converter (FSC) liquid crystal display panel.

An embodiment of the present disclosure also provides a display device, wherein the display device includes a display panel, and the display panel is the display panel 100 provided in the above embodiment. The display panel in the display device provided by the embodiment of the present disclosure may achieve the same technical effects as the display panel 100 in the above-mentioned embodiment, and details are not described herein.

The embodiments of the present disclosure provide a display panel and a display device. The display panel includes a plurality of sub-pixel electrodes and a plurality of data line groups arrayed in rows and columns. The data line group includes at least two sub-data line groups. The sub-pixel electrode includes at least two sub-pixel electrode sections arranged side by side at intervals and coupled to each other. The sub-data line groups are respectively arranged on two sides of the sub-pixel electrode sections in each of the columns. The sub-data line groups of each of the data line groups are respectively connected to the sub-pixel electrodes in different rows and in a same column. By dispersing the data lines in the data line group into each sub-data line group and arranging the plurality of the data line groups on two sides of the sub-pixel electrode section in each of the columns of the sub-pixel electrodes to reduce the width of each of data line groups. Therefore, the shading area of each of the data line groups is reduced, and the problem of dark stripes in the display panel may be improved while ensuring the high refresh frequency of the display panel.

In summary, although the present disclosure is disclosed as above in preferred embodiments, the above preferred embodiments are not intended to limit the present disclosure. Those of ordinary skill in the art may make various changes and modifications without departing from the spirit and scope of the present disclosure. Therefore, the scope of protection of the present disclosure is based on the scope defined by the claims.

What is claimed is:
1. A display panel, comprising:
a plurality of sub-pixel electrodes arrayed in rows and columns; and a plurality of data line groups, wherein each data line group controls a charging state of the sub-pixel electrodes in a corresponding column;

wherein each of the sub-pixel electrodes includes at least two sub-pixel electrode sections arranged side by side at intervals and coupled to each other, each of the data line groups includes at least two sub-data line groups, each of the sub-data line groups includes at least one data line, the sub-data line groups are respectively arranged on two sides of the sub-pixel electrode sections in each of the columns, and the sub-data line groups of each of the data line groups are respectively connected to the sub-pixel electrodes in different rows and in a same column, wherein each of the sub-pixel electrodes further includes a first connecting portion and a second connecting portion, each of the sub-pixel electrode sections includes a plurality of strip electrodes arranged side by side at intervals, the first connecting portion is configured to connect each of the strip electrodes located in a same sub-pixel electrode section, and the second connecting portion is configured to connect each of the sub-pixel electrode sections located in the same sub-pixel electrode.

2. The display panel according to claim 1, wherein the first connecting portion is disposed on at least one end of one of the strip electrodes, the second connecting portion is disposed between adjacent ones of sub-pixel electrode sections in the same sub-pixel electrode, opposite ends of the second connecting portion are respectively connected to an adjacent first connecting portion or connected to the strip electrodes in two adjacent sub-pixel electrode sections.

3. The display panel according to claim 1, wherein at least two the sub-pixel electrode sections located in a same sub-pixel electrode have a same width in an extending direction perpendicular to the data line.

4. The display panel according to claim 1, wherein a width of each of the sub-data line groups is less than or equal to 20 µm.

5. The display panel according to claim 1, wherein a width of each of the sub-data electrodes section in an extending direction perpendicular to the data line is greater than or equal to 20 µm, and less than or equal to 50 µm.

6. The display panel according to claim 1, wherein a width of each of the sub-pixel electrodes in an extending direction perpendicular to the data line is greater than or equal to 100 µm, and less than or equal to 200 µm.

7. The display panel according to claim 1, wherein each of the sub-data line groups in a same data line group is connected to the sub-pixel electrodes in the corresponding column.

8. The display panel according to claim 7, wherein the sub-data line group includes at least two data lines, the data lines in a same sub-data line group are respectively connected to the sub-pixel electrodes in adjacent rows and in the same column.

9. The display panel according to claim 7, wherein the data lines in the same data line group are alternately connected to the sub-pixel electrodes in the corresponding column in turn.

10. The display panel according to claim 1, wherein the display panel further comprises a plurality of scan lines and cascaded gate drive circuits, each of the scan lines is connected to the sub-pixel electrodes in a corresponding row through a switch thin film transistor, and the gate drive circuit of each stage is connected to corresponding one or more scan lines.

11. The display device according to claim 7, wherein the sub-data line group includes at least two data lines, the data lines in a same sub-data line group are respectively connected to the sub-pixel electrodes in adjacent rows and in the same column.

12. A display device, comprising a display panel, wherein the display panel comprises:
a plurality of sub-pixel electrodes arrayed in rows and columns; and
a plurality of data line groups, wherein each data line group controls a charging state of the sub-pixel electrodes in the corresponding column;

wherein each of the sub-pixel electrodes includes at least two sub-pixel electrode sections arranged side by side at intervals and coupled to each other, each of the data line groups includes at least two sub-data line groups, each of the sub-data line groups includes at least one data line, the sub-data line groups are respectively arranged on two sides of the sub-pixel electrode sections in each column, and the sub-data line groups of the data line group are respectively connected to the sub-pixel electrodes in different rows and in a same column, wherein each of the sub-pixel electrodes further includes a first connecting portion and a second connecting portion, each of the sub-pixel electrode sections includes a plurality of strip electrodes arranged side by side at intervals, the first connecting portion is configured to connect each of the strip electrodes located in a same sub-pixel electrode section, and the second connecting portion is configured to connect each of the sub-pixel electrode sections located in the same sub-pixel electrode.

13. The display device according to claim 12, wherein the first connecting portion is disposed on at least one end of one of the strip electrodes, the second connecting portion is disposed between adjacent ones of sub-pixel electrode sections in the same sub-pixel electrode, opposite ends of the second connecting portion are respectively connected to an adjacent first connecting portion or connected to the strip electrodes in two adjacent sub-pixel electrode sections.

14. The display device according to claim 12, wherein at east two the sub-pixel electrode sections located in a same sub-pixel electrode have a same width in an extending direction perpendicular to the data line.

15. The display device according to claim 12, wherein a width of each of the sub-data line groups is less than or equal to 20 µm.

16. The display device according to claim 12, wherein a width of each of the sub-data electrode sections in an extending direction perpendicular to the data line is greater than or equal to 20 µm, and less than or equal to 50 µm.

17. The display device according to claim 12, wherein a width of each of the sub-pixel electrodes in an extending direction perpendicular to the data line is greater than or equal to 100 µm, and less than or equal to 200 µm.

18. The display device according to claim 12, wherein each of the sub-data line groups in a same data line group is connected to the sub-pixel electrodes in the corresponding column.

* * * * *